Patented Sept. 21, 1937

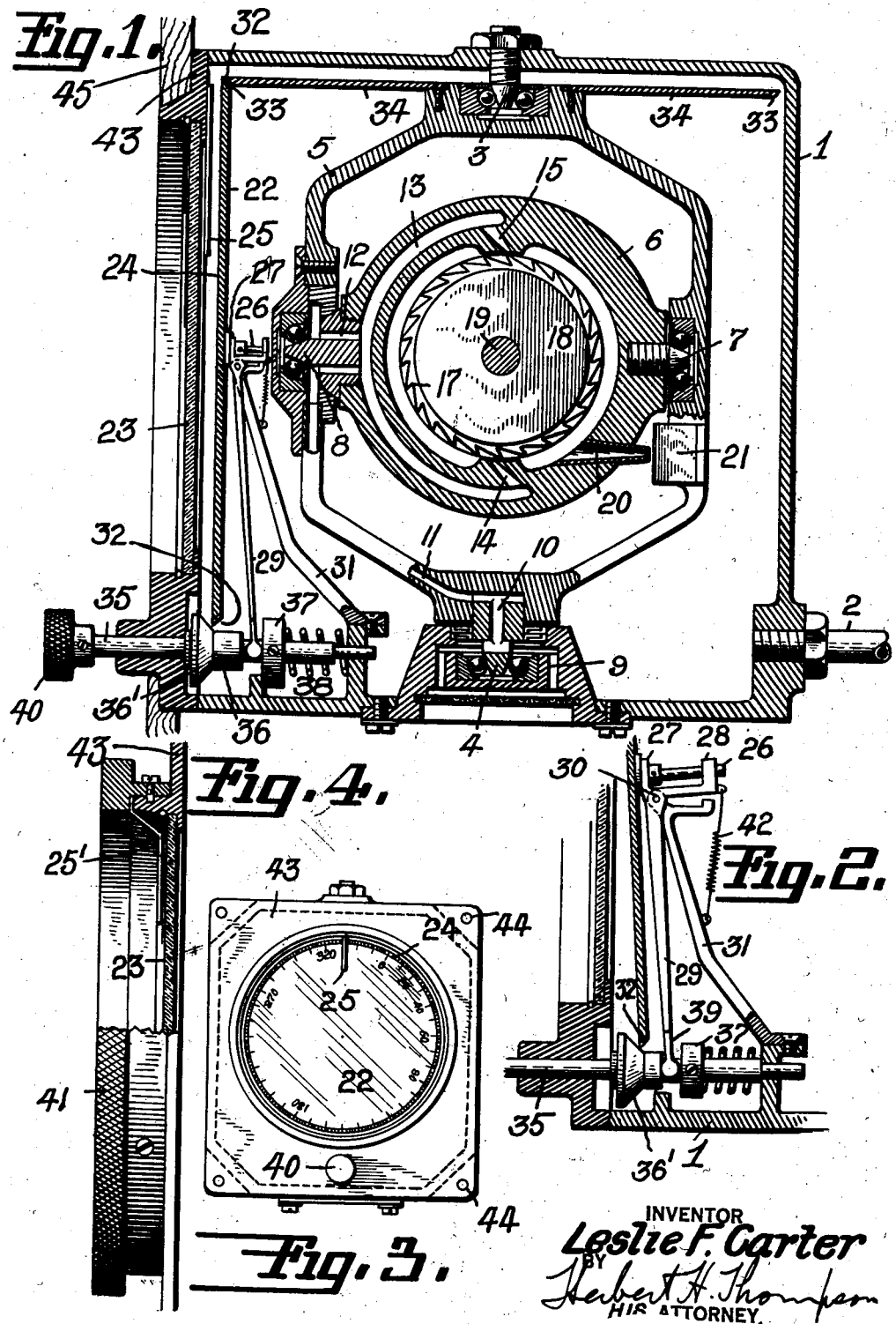

2,093,417

UNITED STATES PATENT OFFICE 2,093,417

DIRECTIONAL GYROSCOPE FOR AIRCRAFT

Leslie F. Carter, Leonia, N. J., assignor to Sperry Gyroscope Company, Inc., Brooklyn, N. Y., a corporation of New York Application May 16, 1934, Serial No. 725,939

11 Claims. (Cl. 33—204)

This invention relates to gyroscopic instruments for aircraft and more especially to the type of instrument known as the directional gyroscope. The present practice in aircraft is to have the dials of all instruments visible on a vertical instrument panel placed in front of the aviator. Therefore the dials must be such as to be read from the front, i. e., in a vertical plane. To this end it has been usual to employ an annular or ring shaped card on directional gyroscopes, which is mounted on the vertical ring. Such an arrangement has the disadvantage that only a small part of the card is visible from the front, so that the aviator must read the figures thereon in order to tell his heading, and it is sometimes difficult to change the course through a predetermined angle. It is also the present practice to lock and reset the entire gyroscope when it is desired to correct the reading thereof as compared to the magnetic compass. This entails complicated locking mechanism to lock the gyroscope about both axes. According to the present invention I propose to overcome both of the above named difficulties by using a vertical disc as the indicator of the position of the gyroscope, and which is visible throughout its entire scale. Also, the gyroscope itself is not reset in order to change the readings thereof, for which purpose the disc may be temporarily disconnected from the gyroscope, reset and reconnected with the gyroscope.

Referring to the drawing illustrating one form my invention may assume,

Fig. 1 is a vertical section of a directional gyroscope with my invention applied thereto.

Fig. 2 is a detail of the setting mechanism with the parts in a different position than shown in Fig. 1.

Fig. 3 is a face view of the instrument on a smaller scale.

Fig. 4 is an elevation, partly in section, of the face of the instrument, showing a modified method of changing the readings by means of an adjustable reference or lubber's line.

The directional gyroscope may be of any conventional type. It is shown as of the air spun type enclosed within a casing 1 which may be made air-tight and from which air is withdrawn through pipe 2 for spinning the rotor. The gyroscope is shown as mounted in the case on vertical bearings 3 and 4, which rotatably support the vertical ring 5. The vertical ring, in turn, is shown as supporting the rotor bearing casing 6 on horizontal trunnions 7 and 8. The air for spinning the rotor enters through the passages 9 in lower bearing 4, whence it passes through channels 10 and 11 in the vertical ring, and thence through channels 12 and 13 in the rotor casing, whence it passes through nozzles 14 and 15 which direct the jets against buckets 17 on the rotor 18. The latter is rotatably mounted by means of shaft 19 in the casing 6. The used air is shown as discharged from casing 6 through a nozzle 20 against a knife edge 21, which may be on the vertical ring to act as an erecting device for the gyroscope.

It will be understood that the gyroscope shown is merely intended to represent any form of directional or similar gyroscope and that my improved card and setting means as hereinafter described, may be applied to other types of gyroscopes.

The indicating or compass card in this instance is shown as a disc 22 rotatably mounted in a substantially vertical plane so that the entire disc is visible through the window 23 in the front of the casing. Said card may be graduated with the usual compass markings 24, which are read with reference to lubber's mark 25 secured to the casing 1. The card is shown as mounted on a short shaft 26 journaled in bearings 27 and 28 in an L or T-shaped lever 29. Said lever, in turn, is pivoted at 30 on a fixed bracket or foot 31, which is secured at its base to the casing 1. The T-shaped lever is normally positioned so that the shaft 26 is horizontal, in which position a driving engagement is secured between the beveled periphery 32 of the card 24 and the beveled periphery 33 of a disc 34 secured to the top of the vertical ring 5, and preferably of the same diameter as card 24. Small teeth may be used on said peripheries if desired. Hence any turning of the vertical ring will turn the compass card 24 through the same angle.

At the bottom of the casing I have shown a push rod 35 on which is mounted a pair of spaced collars 36 and 37. A spring 38 normally tends to hold the push rod outwardly so that the beveled surface 36' on collar 36 does not engage the card 24. The lever 29 is shown as provided at its foot with a fork 39, held between the collars 36 and 37, the lever normally being held so that shaft 26 is horizontal by spring 42 connecting bearing arm 29 of the lever and bracket 31 and also by said spring 38. When rod 35 is pushed inwardly, therefore, the bracket 29 is rotated slightly counter-clockwise so that the surfaces 32 and 33 are disengaged by the resulting tilting of the card. At the same time the cone shaped face 36' on the collar 36 engages the periphery of the disc so that by rotating the knob 40 on shaft 35, the disc may be set to any desired position, whereupon the knob is released and the springs 38 and 42 will return shaft 35 and lever 29 to normal positions, so that the surfaces 32 and 33 will again be engaged. In my invention, therefore, both the facility with which the directional gyroscope may be read is improved and the construction otherwise simplified.

Figure 4 shows a modification in which the lubber's mark 25' is outside of the glass 23 instead of inside, and in which the lubber's line may be turned into any position desired by the aviator. According to this modification the aviator may change the reading of his directional gyro card without turning the compass card, merely by shifting the lubber's line which is secured to and turnable with the knurled ring 41.

In both forms the front plate 43 extends beyond the main casing 1 at the corners to provide screw holes 44 by which the instrument may be secured to the back of the instrument panel 45 with the face visible through a hole therein.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a directional gyroscope, a compass card rotatably mounted in a vertical plane in front of the gyroscope, a driving element mounted on the gyroscope to turn in azimuth therewith and having a driving connection with said card and a rotatable member in front of said card and having an index on which the card is readable, whereby the reading of the card may be changed without resetting or disturbing the gyroscope.

2. The combination with a directional gyroscope, of a compass card rotatably mounted adjacent the gyroscope, a driving element mounted on the gyroscope to turn in azimuth therewith and having a mechanical driving connection with said card to turn the card as the gyroscope turns relative to its mounting, and means for temporarily interrupting said driving connection and resetting said card without resetting or disturbing the gyroscope.

3. In a neutrally mounted directional gyroscope having three degrees of freedom, a compass card rotatably mounted in a vertical plane in front of the gyroscope, a driving element mounted on the gyroscope to turn in azimuth therewith and having a mechanical driving connection with said card, and means for changing the reading of said card without resetting the gyroscope.

4. In a gyroscopic indicator for aircraft, a casing having a vertical front window, and adapted to be mounted on an instrument panel, a vertical indicator disc behind said window, means for rotatably mounting said disc, a gyroscope to the rear of said disc and having a driving connection therewith, and means for tilting said mounting means to disengage said gyroscope and disc, and means for setting said disc while so disengaged.

5. In a directional gyroscope, a compass card rotatably mounted in a vertical plane in front of the gyroscope, a driving element mounted on the gyroscope to turn in azimuth therewith and having a driving connection with said card, a push rod operable from the front of said gyroscope, means connected therewith for tilting said card to interrupt said driving connection when said rod is pushed, and means on said rod engaging said card to simultaneously reset the same by rotation of said rod.

6. In a directional gyroscope, a normally vertical compass card and cooperating index, a normally horizontal bearing for rotatably supporting one of said parts, a driving connection between said last named part and said gyroscope to turn said part about its pivot through the same angle that the gyroscope apparently turns in azimuth, and means for tilting said bearing to disengage said part and the gyroscope, when resetting is desired.

7. The combination with a neutrally mounted directional gyroscope having three degrees of freedom, of an independent compass card rotatably mounted adjacent said gyroscope, a driving connection between said gyroscope and card to turn the latter from the former, a push button device for temporarily breaking said driving connection, and an auxiliary driving connection between said device and said card whereby the card may be reset by rotating said device while the card is detached from said gyroscope.

8. The combination with a neutrally mounted directional gyroscope having three degrees of freedom, of an independent compass card rotatably mounted adjacent said gyroscope, a driving connection between said gyroscope and card to turn the latter from the former, a manual resetting device for the card, and means operated by said device for interrupting its connection with the gyroscope while being reset.

9. The combination with a neutrally mounted directional gyroscope having three degrees of freedom, a compass card adjacent said gyroscope, a tiltable mounting for said card whereby a portion thereof may be brought into and out of contact with a rotatable part of said gyroscope, and a single manual means for tilting said card and resetting the same.

10. In a gyroscopic indicator, a neutrally mounted azimuth gyroscope, indicating means detachably connected directly to and controlled by said gyroscope, and means for adjusting said indicating means independently of said gyroscope to set a predetermined course.

11. In a gyroscopic indicator including a casing adapted for mounting on an instrument panel and having a window at the front thereof for viewing an indicating means therein, a gyroscope comprising a vertical ring in said casing and journaled for relative rotation about a vertical axis, a horizontal ring pivoted in said vertical ring for relative angular movement about a horizontal axis perpendicular to said vertical axis, a gyro rotor journaled in said horizontal ring for rotation about a second horizontal axis perpendicular to said first horizontal axis, said rotor and said horizontal ring being substantially balanced and having substantially little or no pendulosity, whereby the spin axis of said rotor remains substantially fixed in the azimuth plane upon relative movement between the vertical ring and the casing about the vertical axis, indicating means detachably connected to said vertical ring for indicating through the window of said casing a direction to be maintained thereby under the control of the gyroscope, and means for setting said indicating means independently of the gyroscope to indicate a predetermined direction, whereby the spin axis of the gyroscope remains undisturbed while the setting is made.

LESLIE F. CARTER.